(12) United States Patent
Leaming et al.

(10) Patent No.: US 11,260,791 B2
(45) Date of Patent: Mar. 1, 2022

(54) VEHICULAR, ADAPTIVE BRAKE LIGHT TO CUSTOM LIGHT SEQUENCING SYSTEM

(71) Applicants: Christopher R. Leaming, Gilbert, AZ (US); Robert F. Leaming, Gilbert, AZ (US)

(72) Inventors: Christopher R. Leaming, Gilbert, AZ (US); Robert F. Leaming, Gilbert, AZ (US)

(73) Assignee: XTC Power Products LLC, Chandler, AZ (US)

(*) Notice: Subject to any disclaimer, the term of this patent is extended or adjusted under 35 U.S.C. 154(b) by 65 days.

(21) Appl. No.: 15/978,084

(22) Filed: May 11, 2018

(65) Prior Publication Data

US 2021/0309144 A1    Oct. 7, 2021

Related U.S. Application Data

(60) Provisional application No. 62/505,875, filed on May 13, 2017.

(51) Int. Cl.
| | |
|---|---|
| *B60Q 1/44* | (2006.01) |
| *B60Q 1/46* | (2006.01) |
| *B60Q 1/00* | (2006.01) |
| *H01H 47/00* | (2006.01) |
| *F21W 103/35* | (2018.01) |
| *F21W 103/20* | (2018.01) |
| *F21S 43/50* | (2018.01) |
| *B60Q 5/00* | (2006.01) |
| *F21W 103/30* | (2018.01) |

(52) U.S. Cl.
CPC ............. *B60Q 1/44* (2013.01); *B60Q 1/0094* (2013.01); *B60Q 1/46* (2013.01); *B60Q 5/001* (2013.01); *F21S 43/50* (2018.01); *H01H 47/00* (2013.01); *F21W 2103/20* (2018.01); *F21W 2103/30* (2018.01); *F21W 2103/35* (2018.01)

(58) Field of Classification Search
None
See application file for complete search history.

(56) References Cited

U.S. PATENT DOCUMENTS

| | | | | |
|---|---|---|---|---|
| 4,903,174 | A * | 2/1990 | Busby | B60Q 1/30 340/431 |
| 9,616,810 | B1 * | 4/2017 | Tucker | B60Q 1/0082 |

* cited by examiner

*Primary Examiner* — Ashok Patel
(74) *Attorney, Agent, or Firm* — Michael T. Wallace

(57) ABSTRACT

A vehicular, adaptive brake light to custom light sequencing system generally includes an OEM vehicular brake light circuit electrically connected to OEM brake lights of a vehicle, and an aftermarket flashing circuit electrically connected within or to the OEM vehicular brake light circuit to cause the OEM brake lights to flash. They system further includes an aftermarket directional indicator circuit electrically connected within or to the OEM vehicular brake light circuit and electrically connected to the aftermarket flashing circuit to effectuate a flashing of at least one of an OEM left brake light and an OEM right brake light. The system also includes an aftermarket hazard light circuit that is electrically connected within or to the OEM brake light circuit and to the aftermarket flashing circuit to effectuate a flashing hazard by the OEM brake lights.

18 Claims, 2 Drawing Sheets

VEHICULAR, ADAPTIVE BRAKE LIGHT TO CUSTOM LIGHT SEQUENCING SYSTEM

TECHNICAL FIELD

This disclosure relates generally to aftermarket electronic accessories for an UTV (Utility Task Vehicle), and relates more particularly to integrating various light indicator systems into a UTV's OEM (Original Equipment Manufacturer) brake light and/or other electronic systems.

CROSS-REFERENCE TO RELATED APPLICATIONS

This disclosure claims priority to U.S. provisional patent application 62/505,875 filed May 13, 2017; the entire contents of which are hereby incorporated by reference.

BACKGROUND

Motorized vehicles have evolved recently into a variety of user specific transports. While motorized vehicles, such as ATV's (All Terrain Vehicles) now exist in many forms and fashions, in large part they originally were developed as sport-quad's for a single user. ATV's have now evolved to accommodate various types of uses. For example, modern ATV's are routinely customized for sport, racing, utility, hunting, farming, light transport, recreation, off-road use, military use and the like; and manufacturers are now providing such use specific ATV's directly tailored to the user. Moreover, these ATV's have evolved beyond a single user quad type configuration, and have divested into two person side-by-side, semi-enclosed vehicles and even four person transports. Advanced ATV's even have many of the features of modern day automobiles, and many regions have approved such vehicles for use on public roads, provided they are accommodated with certain safety features.

There are though, some current design aspects that hinder the use of many ATV's for widespread use in public. For example, some of the more modern two person and four person vehicles fall within certain govt. safety standards that mandate if a vehicle is designated to accommodate on-road, public use, it must be manufactured and tested to meet certain safety standards. But, if a manufacturer wishes to forego the need to comply with such testing and safety standards, then government mandates require that such vehicles cannot be designated for road use and are to be manufactured without certain accessories that would otherwise have them fall under the more stringent requirements. For example, such vehicles not designated for road use cannot be equipped with components, such as turn signals, reverse lights, hazard lights, and others; if such vehicles were so equipped then they would be deemed manufactured for road use and subsequently subjected to the more stringent safety testing. Thus, manufacturers provide their particular vehicles without such accessories. However, conscientious users of such vehicles, although not mandated, desire to equip their vehicles with such accessories. Thus a need has arisen to provide such accessories in the aftermarket and to seamlessly integrate them into OEM systems. For example, one such vehicle that is manufactured outside of the government standards because it is not intended for public on-road use are UTV's (Utility Task Vehicles), a derivative of the ATV; and in accordance with the government guidelines that prevent them from comprising turn signal indicator lights, hazard lights, reverse lights, area lights, etc, they are prime candidates for aftermarket upgrades to include such light systems. Therefore, a user wishing to use their UTV for public road use is required to have at least turn signal indicators and a user would need to purchase an aftermarket turn signal kit and adapt it to upgrade their UTV. However, most aftermarket adapter and upgrade kits, though, are clearly by design a "one size fits all" configuration that detract from the OEM styling, adaption, and/or operation of the vehicle.

A unique solution and disclosed herein is an adaptive system that provides for a UTV and like vehicles to adapt their OEM brake lights such that the OEM brake lights may be used as both brake lights and as turn signal indicators, hazard indicators, reverse indicators, or other desired light indicating/flashing modes that integrate with OEM electronic systems. The system disclosed herein overcomes the above noted downsides to the current state of the art and disadvantages of "one size fits all kits", and is disclosed by the present, vehicular, adaptive brake light to custom light sequencing system.

SUMMARY

Among various representative embodiments, the present vehicular, adaptive brake light to custom light sequencing system may utilize the OEM vehicular brake light circuit that is electrically connected to the OEM brake lights of a vehicle, and the present system discloses incorporating an aftermarket flashing circuit electrically connected within or to the OEM vehicular brake light circuit, which causes the OEM brake lights to flash. The system further includes an aftermarket directional indicator circuit electrically connected within or to the OEM vehicular brake light circuit as well as electrically connected to the aftermarket flashing circuit to effectuate a flashing of at least one of an OEM left brake light and an OEM right brake light. The system also includes an aftermarket hazard light circuit that is electrically connected within or to the OEM brake light circuit and to the aftermarket flashing circuit to effectuate a flashing hazard by the OEM brake lights. The disclosed system further comprises aftermarket front right and left lights that can be added to the vehicle to effectuate a turning or hazard indication at the front of the vehicle.

BRIEF DESCRIPTION OF THE DRAWINGS

A more complete understanding of a vehicular, adaptive brake light to custom light sequencing system may be derived by referring to the detailed description and claims when considered in connection with the following illustrative FIGS. In the following FIGS., like reference numbers refer to similar elements and/or steps throughout the FIGS.

The various embodiments and elements in the FIGS. are illustrated for simplicity and clarity, and have not necessarily been rendered according to any particular assembly or sequence. For example, assemblies and methods may be performed sequentially, concurrently or in any of a variety of orders.

DETAILED DESCRIPTION

A vehicular, adaptive brake light to custom light sequencing system may be described herein in terms of a variety of elements, articles, devices, systems, schematics, or functional block components and/or various method or processing steps. Such elements, articles, devices, systems, schematics, or functional blocks, methods or processing steps may be realized by any number of electrical and/or hardware components that perform specified functions and that may achieve various results. For example, the vehicular, adaptive brake light to custom light sequencing system may employ various wiring configurations, power control boxes, relays, switches, diodes, power cords, wires, wiring harnesses, electrical connectors, lights and the like having any number and variety of configurations that may be understood by those skilled in the art. Moreover, the vehicular, adaptive brake light to custom light sequencing system may further employ various hardware components to integrate the system in a functional, efficient, and aesthetically desirable manner to the vehicle. In addition, the vehicular, adaptive brake light to custom light sequencing system may be practiced in conjunction with any number of OEM vehicular electrical environments and may be customizable for a particular custom light sequencing use, be it for pleasure, sport, hunting, military use, law enforcement, off-road use, pubic road use, etc. And the vehicular, adaptive brake light to custom light sequencing systems that are described are merely representative embodiments and applications of use. Further, the vehicular, adaptive brake light to custom light sequencing system may employ any number of conventional techniques for manufacturing, packaging, marketing, selling, distributing, and the like.

Figure 1:
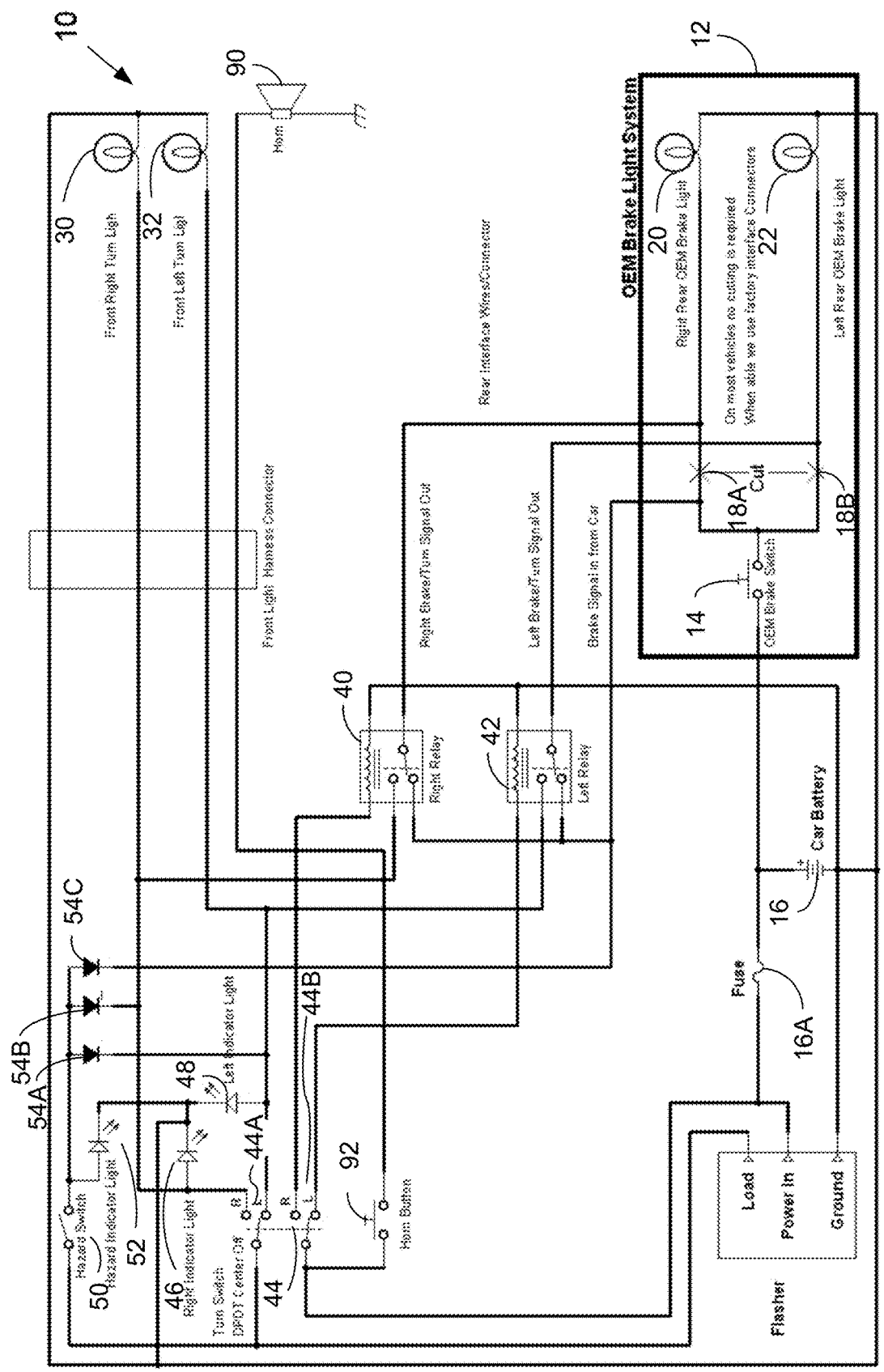
FIG. 1 representatively illustrates an electrical diagram that depicts an exemplary wiring scheme to achieve adapting brake lights to function as turn signal indicators and/or hazard lights.

Various representative embodiments of a vehicular, adaptive brake light to custom light sequencing system may be applied to any electrical system that may be re-configured and/or adapted from a first lighting indicator, such as a brake light, to a second lighting indicator, such as turn signal indicators or hazard lights, all of which will be disclosed further herein. Referring now to FIG. 1, an embodiment of a vehicular, adaptive brake light to custom light sequencing system comprises the wiring diagram as shown to adapt operative OEM brake lights to also operate in a custom light sequencing manner, in this case, to operate as turn signal indicators or alternatively as hazard light indicators.

It will be understood by those skilled in the art that the wiring diagram of FIG. 1 is merely a schematic of how the adaptive brake light to custom light sequencing system is integrated within OEM wiring. The wiring diagram is merely one embodiment of integration by the disclosed system, and those skilled in the art having general electrical wiring acumen will understand that the system disclosed may be adapted within a variety of other types of OEM wiring diagrams to effectuate the custom lighting and sequencing described. The unique aspect of the system disclosed is that the circuitry and wiring is integrated with the OEM wiring scheme and not a bypass around the OEM wiring system. By integrating the system disclosed herein to the OEM wiring scheme, fail safe aspects of the OEM lighting are maintained and a more robust functionality of the aftermarket upgrades is witnessed.

In a preferred embodiment, a vehicular, adaptive brake light to custom light sequencing system ties into an OEM brake light circuit to use the OEM factory brake lights as turn indicators and/or hazard lights. The single OEM brake circuit is expanded to operate as a left and a right turn signal indicator circuit, hazard light circuit, and of course the OEM brake light circuit. In an exemplary embodiment, electromechanical relays are employed rather than typical mechanical column turn signal switches to actuate the converted left and right turn/brake circuit. However, those skilled in the art will understand that the present vehicular, adaptive brake light to custom light sequencing system may comprise mechanical column turn switches if so desired.

In a preferred embodiment, and as diagrammatically shown by the electric diagram of FIG. 1, a vehicular, adaptive brake light to custom light sequencing system 10 is shown. In an embodiment, OEM rear single brake light circuit 12 comprises OEM brake switch 14, coupled to a vehicular brake pedal not shown, that when energized, such as by car battery 16 through fuse 16A, right brake light 20 and left brake light 22 are simultaneously illuminated to indicate a braking condition by the vehicle. The present system 10 may be severed, or in an alternate embodiment may employ interface connectors to couple, at a point just before the brake light load, for example at points 18A and 18B. The wiring is then coupled to SPDT (Single Pole Double Throw) relays, for example right relay 40 and left relay 42, which comprises a NC (Normally Closed) circuit. The SPDT relays are then coupled respectively to the right and left brake lights 20 and 22 so that they may be operatively used, in a flashing manner; as turn signal indicators when coupled to and energized by the flashing and directional circuits as will be described. Those skilled in the art will understand that by using the NC portion relays 40 and 42, a fail-safe position is established such that if the disclosed turn signal part of the system suffers a power loss, the OEM brake lights will still be able to operate to send the brake light signal to both brake lights. In an embodiment, a NO (Normally Open) brake light circuit comprises a flasher circuit such that when energized, it provides switching the brake circuit to the turn signal flasher circuit.

In a preferred embodiment, a DPDT (Double Pole Double Throw) center off switch 44 is used as the turn signal actuator. Input 44A of the DPDT switches the flasher circuit to actuate, either the front right or left side indicator lights 46 and 48 as well as the front right or left turn signal lights 30 and 32, operatively making the lights flash in the respective direction. At input 44B of the DPDT switch, a 12V DC potential is introduced, and depending on which is selected by a user, either the right "R" relay or the left "L" relay is energized to switch the rear lights 20 and 22 from the solid brake light to the flasher circuit, thus indicating either a left or right turn.

In an embodiment of the present disclosure, a third circuit is routed to create hazard light sequencing, whereby all the lights 20, 22, 30, and 32 flash in a standard hazard flashing fashion. This third circuit is electrically connected to the flasher circuit via a SPST (Single Pole Single Throw) switch 50, which is subsequently divided into three circuits that are tied respectively into the left, right and stop (brake) circuits, as well as a hazard indicator light 52. In an embodiment, diodes 54A, 54B and 54C are used to prevent them from cross feeding. In this embodiment, if the brakes are applied it will stop the rear lights 20 and 22 from flashing, as in a typical automobile; the diodes 54A-54C stop the brake signal from going to the front turn signal lights 30 and 32 or cross feeding.

Continuing with FIG. 1, system 10 schematically depicts horn 90 and horn button 92. It will be appreciated by those skilled in the art that while the horn is depicted as a stand-alone circuit, in an embodiment horn 90 and horn switch 92 may be tied into the aftermarket flashing circuit and directional circuit, and in another embodiment may even be tied into the hazard light sequencing circuit. As mentioned earlier, the purpose of the present disclosure is to enhance the safety features of a vehicle that does not comprise turn signal indicators or hazard indicators. While the added turn signal indicators and hazard indicators provide visual cues to others that the vehicle is turning or experiencing a hazard condition; in an embodiment, those skilled in the art may electrically tie the horn circuit into the aftermarket turn signal and/or hazard circuits disclosed to additionally provide an audible cue during turning and/or a hazard condition, thereby further enhancing the safety features of their vehicle. This may be preferable since these types of vehicles, i.e. UTV's, that are primary candidates for the aftermarket upgrades disclosed, are often used in environments that may not necessarily always lend themselves to benefit merely from visual cues; for example, wooded areas and trails. Incorporating an audible cue, such as the horn, further completes the safety aspect of upgrades a user may desire.

It will be appreciated by those skilled in the art that while the present disclosure discusses updating a UTV with turn signal directional indicators and hazard indicators by utilizing the existing brake lights and added front turn signal lights, the present disclosure is not limited in that regard. For example, UTV vehicles, which are the primary vehicles considered herein to incorporate the disclosed upgrades, may comprise various other types of lighting that may benefit from the disclosed turn signal and hazard indicator circuits. UTV's often comprise various aftermarket or even additional standard OEM lighting, for example various light bars, ground effects lighting, dune lighting, trailer hitch lighting, flood lights, fog lights, and several others now known or that may be developed in the future. Those skilled in the art will understand that the present disclosure may be configured to electrically tie into such lights to further effectuate the turning and/or hazard visual cues beyond merely the brake lights and added front turn signal lights.

It should be understood by those skilled in the art that the turn signal indicator switch disclosed herein is, in a preferred embodiment, a manually activated switch, that is, a user wishing to indicate a turn manually activates the switch in a corresponding manner to indicate either a right or left turn. However, unlike conventional column mounted turn signal switches that are disengaged once the turn is complete, i.e. via a mechanical or electro-mechanical system integrated with a steering wheel, the manual switch of the present disclosure must be manually disengaged when the turn indicator is no longer desired. In an embodiment, the present disclosure may further incorporate a mechanical, electro-mechanical, positional sensor, and the like systems to automatically disengage the turn indicator circuit once a turning of the vehicle by the user of the UTV is complete. In an alternate embodiment, a timing relay may be integrated into the circuits such that the turn switch electrically disengages the circuit after a set period of time. And in yet in another embodiment, the UTV may be retro-fitted with a conventional columnar mounted type switch that is configured to disengage the turn signal indicator once a turning of the UTV is complete.

To reiterate, the present disclosure is primarily directed to UTV's having no OEM turn signal lights, and a user may update their vehicle as shown by system 10 of FIG. 1 to use the OEM brake lights as additional turn indicators along with added aftermarket front turn signal lights. Those skilled in the art though, will appreciate that the present disclosure further contemplates the addition of aftermarket rear turn signal lights as well, and that such added rear turn signal lights may operate in conjunction with the brake light system described herein or independently. Again, while the present disclosure is directed towards vehicles that lack turn signals, such as UTV's, the present disclosure may be similarly adapted to vehicles and their corresponding electrical circuits that already comprise turn signals, for example, to incorporate the added feature of the vehicle to have their brake lights flash in a "turn signal" manner as disclosed.

Figure 2:
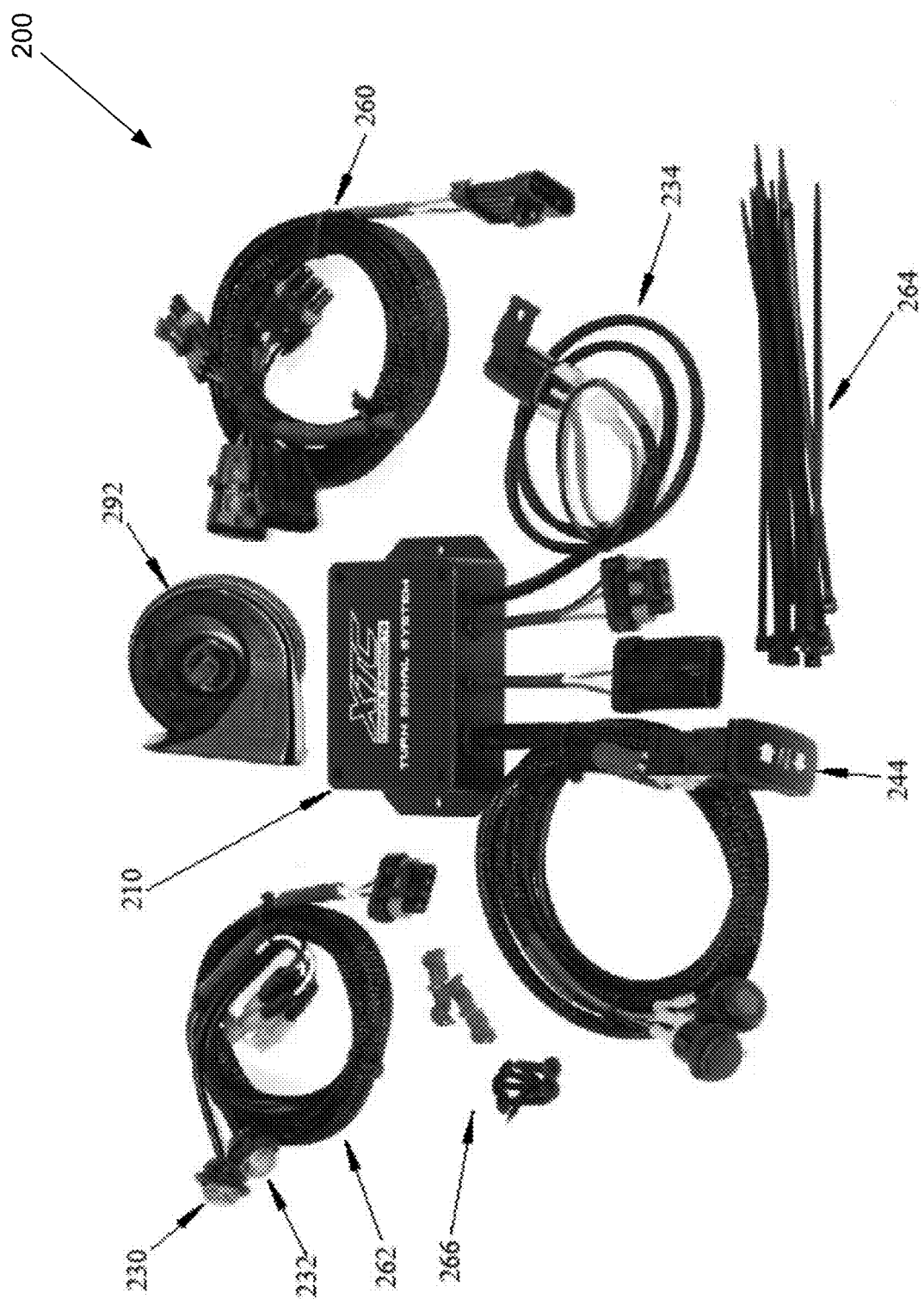
FIG. 2 representatively depicts an embodiment of hardware for a vehicular, adaptive brake light to custom light sequencing system.

Turning now to FIG. 2, a vehicular, adaptive brake light to custom light sequencing system comprises various electrical and hardware components to effectuate an operative vehicular, adaptive brake light to custom light sequencing system. For example the system may comprise various system control boxes, power control boxes, wiring, wiring harnesses, electrical/mechanical relays, electrical/mechanical switches, electrical relays, electrical connectors, lights, horns, and the like known to those skilled in the art. The system may further comprise various brackets, secures, ties, screws, grommets, and the like as hardware to secure various system components and provide for an aesthetically pleasing installation of the system. In an embodiment, a vehicular, adaptive brake light to custom light sequencing system 200 comprises control box 210 to house, at least partially, the various wiring and controls to effectuate the disclosed system depicted by the wiring diagram of FIG. 1. System 200 further comprises: various turn signal and/or hazard indicator lights 230 and 232; power cord 234 to relay electrical signals from control box 210 to lights 230 and 232; and turn signal switch 244 to effectuate the turn signal system by the user. System 200 further comprises various other electrical and hardware components to provide for the operation of an adaptive brake light to custom light sequencing system, such as, wiring harness and connectors 260; additional indicator lighting and control wiring 262; wiring ties 264; and hardware clips and screws 266. System 200 may further comprise horn 292, which may be incorporated via a horn switch and/or control (not shown). Those skilled in the art will understand that various other hardware items may be incorporated, such as face plates, switch plates, hardware mounting templates, wiring harnesses, and others.

It will be appreciated by those skilled in the art that a preferred embodiment discloses a vehicular, adaptive brake light to custom light sequencing system, but a variety of other configurations may be employed without departing from the scope of this disclosure. For example, while this disclosure is generally directed towards the brake light system of a vehicle not having turn signal indicators, the present disclosure is not limited in merely that regard. A vehicle that does have turn signals may be similarly adapted, or vehicles having a reversing light system may be similarly adapted. Any lighting circuit of a vehicle may be adapted such that it operates as, perhaps, additional brake indicators, turn indicators, hazard indicators, reverse indicators, etc. Moreover, the present disclosure may be adapted to a lighting system of any vehicle, such as an ATV, UTV, automobile, motorcycle, RV, boat, snowmobile, airplane, etc.

It will further be understood by those skilled in the art that the system disclosed may be configured or benefited by other systems, for example, radio systems, ignition systems, security systems, sun-roof systems, trailer systems, etc.

Those skilled in the art will understand that while many exemplary embodiments of a vehicular, adaptive brake light to custom light sequencing system have been described, many other embodiments may comprise various other electrical and/or hardware elements not specifically described yet known to those in the art, such as, various wiring configurations, wires, switches, relays, power control boxes, system control boxes, wireless relays, and the like. Furthermore, any of the embodiments described may include some, all, or none of the elements of any of the embodiments described. Finally, while the spirit and scope of this disclosure has focused primarily on the wiring configuration and physical elements to effectuate the vehicular, adaptive brake light to custom light sequencing system, this disclosure contemplates any variety of other electrical configurations as well as for other purposes. For example, the present disclosure discloses embodiments related to electro-mechanical configurations to effectuate the vehicular, adaptive brake light to custom light sequencing system, but other configurations, such as those that may use a solid-state system to similarly effectuate adapting brake lights to a custom light sequencing system, may be employed.

In the foregoing specification, the vehicular, adaptive brake light to custom light sequencing system has been described with reference to various embodiments. Modifications and changes may be made, however, without departing from the scope of the vehicular, adaptive brake light to custom light sequencing system as set forth in the claims. The specification and figures are illustrative, rather than restrictive, and any modifications are intended to be included within the vehicular, adaptive brake light to custom light sequencing system. Accordingly, the scope of the vehicular, adaptive brake light to custom light sequencing system should be determined by the claims and their legal equivalents rather than by merely the embodiments described.

For example, the components and/or elements recited in any apparatus, article, device, and the like claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes", "is" or any variation thereof, are intended to reference a non-exclusive inclusion, such that a process, method, article, composition, device, system or apparatus that comprises a list of elements does not include only those elements recited, but may also include other elements not expressly listed or inherent to such process, method, article, composition, device, system or apparatus. Other combinations and/or modifications of the above-described structures, arrangements, applications, proportions, elements, materials or components used in the practice of the vehicular, adaptive brake lights to custom light sequencing system, in addition to those not specifically recited, may be varied or otherwise particularly adapted to specific environments, manufacturing specifications, design parameters or other operating requirements without departing from the general principles of the same.

The invention claimed is:

1. A vehicular, adaptive brake light to custom light sequencing system comprising:
   an OEM left brake light;
   an OEM right brake light;
   an OEM vehicular brake light circuit electrically connected to the OEM left and right brake lights of a vehicle;
   an aftermarket flashing circuit electrically connected to the OEM vehicular brake light circuit to cause the OEM left and right brake lights to flash; and
   an aftermarket directional indicator circuit electrically connected to the OEM vehicular brake light circuit and electrically connected to the aftermarket flashing circuit to effectuate a flashing of at least one of the OEM left brake light and the OEM right brake light.

2. The system of claim 1 further comprising aftermarket front right and front left turn signal lights, wherein the aftermarket front right and front left turn signal lights are electrically connected to the aftermarket flashing circuit and the aftermarket directional indicator circuit.

3. The system of claim 2, further comprising an aftermarket hazard light circuit, wherein the aftermarket hazard light circuit is electrically connected to the OEM vehicular brake light circuit and to the aftermarket flashing circuit to effectuate a flashing of the OEM left and right brake lights.

4. The system of claim 3, wherein the aftermarket hazard light circuit is electrically connected to the aftermarket front right and front left turn signal lights.

5. The system of claim 3, further comprising an OEM horn switch and an OEM horn, wherein the OEM horn switch and the OEM horn are electrically connected to the aftermarket flashing circuit and the aftermarket directional indicator circuit.

6. The system of claim 3, further comprising an aftermarket horn switch and an aftermarket horn, wherein the aftermarket horn switch and the aftermarket horn are electrically connected to the aftermarket flashing circuit and the aftermarket directional indicator circuit.

7. A vehicular, adaptive brake light to custom light sequencing system comprises:
   a vehicle including,
      an OEM left brake light;
      an OEM right brake light;
      an OEM vehicular brake light circuit electrically connected to effectuate illumination of the OEM left and right brake lights;
      an aftermarket flashing circuit electrically connected to the OEM vehicular brake light circuit to cause the OEM left and right brake lights to flash; and
      an aftermarket directional indicator circuit electrically connected to the OEM vehicular brake light circuit and electrically connected to the aftermarket flashing circuit to effectuate a flashing of at least one of the OEM left brake light and the OEM right brake light.

8. The system of claim 7, wherein the vehicle further includes a right SPDT relay switch and a left SPDT relay switch and wherein the aftermarket flashing circuit electrically effectuates the OEM left and right brake light flashing via the right SPDT relay switch and the left SPDT relay switch.

9. The system of claim 8, wherein the vehicle further includes a battery and wherein the left and right SPDT relay switches are further electrically connected to the aftermarket directional indicator circuit, the aftermarket directional indicator circuit comprising:
   a front right turn signal light;
   a front left turn signal light; and
   a DPDT center OFF switch comprising,
      a first input coupled to the aftermarket flashing circuit and configured to activate at least one of the front right turn signal light and the front left turn signal light; and
      a second input coupled to the battery, wherein in either ON position the DPDT center OFF switch energizes at least one of the left SPDT relay switch and the right SPDT relay switch to switch the OEM left and right brake lights from a solid brake light illumination to the flashing of at least one of the OEM left brake light and the OEM right brake light.

10. The system of claim 9, wherein the vehicle further comprises:
an aftermarket hazard light circuit; and
a SPST switch that is electrically connected to the aftermarket flashing circuit, wherein the aftermarket hazard light circuit includes diodes that are electrically connected to effectuate a flashing of the front right turn signal light, the front left turn signal light, and the OEM left and right brake lights.

11. The system of claim 10, wherein the vehicle further comprises an OEM horn switch and an OEM horn, and wherein the OEM horn switch and the OEM horn are electrically connected to the aftermarket flashing circuit and the aftermarket directional indicator circuit.

12. The system of claim 10, wherein the vehicle further comprises an aftermarket horn switch and an aftermarket horn, and wherein the aftermarket horn switch and the aftermarket horn are electrically connected to the aftermarket flashing circuit and the aftermarket directional indicator circuit.

13. A vehicular, adaptive brake light to custom light sequencing system comprising:
an OEM left brake light;
an OEM right brake light;
an OEM vehicular brake light circuit electrically connected to effectuate the OEM left and right brake light illumination;
an aftermarket flashing circuit electrically connected to the OEM vehicular brake light circuit to cause the OEM left and right brake lights to flash; and
an aftermarket directional indicator circuit electrically connected to the OEM vehicular brake light circuit and electrically connected to the aftermarket flashing circuit to effectuate a flashing of at least one of the OEM left brake light and the OEM right brake light.

14. The system of claim 13, further comprising a right SPDT relay switch and a left SPDT relay switch wherein the aftermarket flashing circuit electrically effectuates the OEM left and right brake light flashing via the right SPDT relay switch and left SPDT relay switch.

15. The system of claim 14, further comprising a battery wherein the left and right SPDT relay switches are further electrically connected to the aftermarket directional indicator circuit, the aftermarket directional indicator circuit comprising:
a front right turn signal light;
a front left turn signal light; and
a DPDT center OFF switch comprising,
a first input coupled to the aftermarket flashing circuit and configured to activate at least one of the front right turn signal light and the front left turn signal light; and
a second input coupled to the battery, wherein in either ON position the DPDT center OFF switch energizes at least one of the left SPDT relay switch and the right SPDT relay switch to switch the OEM left and right brake lights from a solid brake light illumination to the flashing of at least one of the OEM left brake light and the OEM right brake light.

16. The system of claim 15, further comprising:
an aftermarket hazard light circuit; and
a SPST switch that is electrically connected to the aftermarket flashing circuit, wherein the aftermarket hazard light circuit includes diodes that are electrically connected to effectuate a flashing of the front right turn signal light, the front left turn signal light, and the OEM left and right brake lights.

17. The system of claim 15, further comprising an OEM horn switch and an OEM horn, wherein the OEM horn switch and the OEM horn are electrically connected to the aftermarket flashing circuit and the aftermarket directional indicator circuit.

18. The system of claim 15, further comprising an aftermarket horn switch and an aftermarket horn, wherein the aftermarket horn switch and the aftermarket horn are electrically connected to the aftermarket flashing circuit and the aftermarket directional indicator circuit.

* * * * *